(12) United States Patent
Hilliard

(10) Patent No.: US 8,897,332 B2
(45) Date of Patent: Nov. 25, 2014

(54) CIRCULAR OPTICAL CAVITY ELECTRONICALLY SWITCHED BETWEEN AT LEAST TWO DISTINCT CAVITY MODES

(76) Inventor: Donald B Hilliard, El Granada, CA (US)

( * ) Notice: Subject to any disclaimer, the term of this patent is extended or adjusted under 35 U.S.C. 154(b) by 380 days.

(21) Appl. No.: 13/065,119

(22) Filed: Mar. 14, 2011

(65) Prior Publication Data

US 2011/0164631 A1 Jul. 7, 2011

Related U.S. Application Data

(60) Continuation-in-part of application No. 12/082,887, filed on Apr. 14, 2008, now Pat. No. 7,907,655, which is a division of application No. 10/968,280, filed on Oct. 18, 2004, now Pat. No. 7,408,969, and a continuation-in-part of application No. 09/839,254, filed on Apr. 20, 2001, now Pat. No. 6,807,216.

(60) Provisional application No. 60/236,446, filed on Sep. 29, 2000.

(51) Int. Cl.
*H01S 3/091* (2006.01)
*H01S 3/08* (2006.01)

(52) U.S. Cl.
CPC ......... *H01S 3/08059* (2013.01); *H01S 3/08009* (2013.01); *H01S 3/08* (2013.01); *H01S 3/08045* (2013.01)

USPC .................................. 372/70; 372/19; 372/67

(58) Field of Classification Search
USPC .......................................................... 372/70
See application file for complete search history.

(56) References Cited

U.S. PATENT DOCUMENTS

| | | | | | |
|---|---|---|---|---|---|
| 4,897,844 | A | * | 1/1990 | Schimpe | 372/26 |
| 5,357,591 | A | * | 10/1994 | Jiang et al. | 385/37 |
| 5,379,315 | A | * | 1/1995 | Meinzer | 372/55 |
| 5,748,654 | A | * | 5/1998 | Marabella et al. | 372/19 |
| 2004/0233960 | A1 | * | 11/2004 | Vetrovec | 372/67 |

* cited by examiner

Primary Examiner — Xinning Niu

(57) ABSTRACT

A laser cavity structure is disclosed which pertains to laser resonator geometries possessing circular symmetry, such as in the case of disk or spherical lasers. The disclosed invention utilizes a very-high finesse Bragg reflector (VHF-BR) thin film reflectors of many layer pairs of very small refractive index difference, the VHF-BR deposited on a surface of revolution, thereby forming an optical cavity. These dielectric reflectors are disposed in such a way as to allow selection of preferred low order modes and suppression of parasitic modes while allowing a high cavity Q factor for preferred modes. The invention disclosed, in its preferred embodiments, is seen as particularly useful in applications requiring high efficiency in the production and coupling of coherent radiation. This is accomplished in a cavity design that is relatively compact and economical.

20 Claims, 2 Drawing Sheets

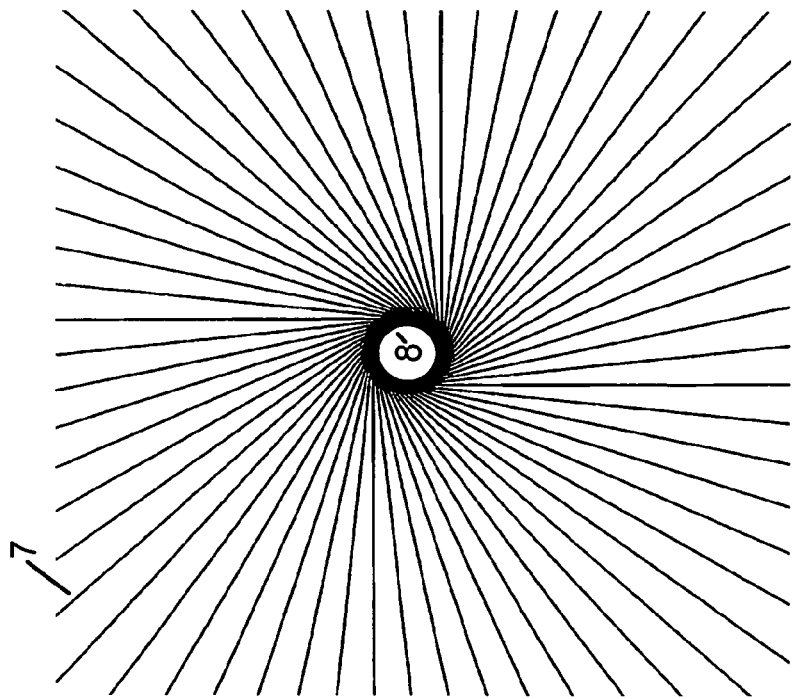
FIG. 1(b) coupling mode
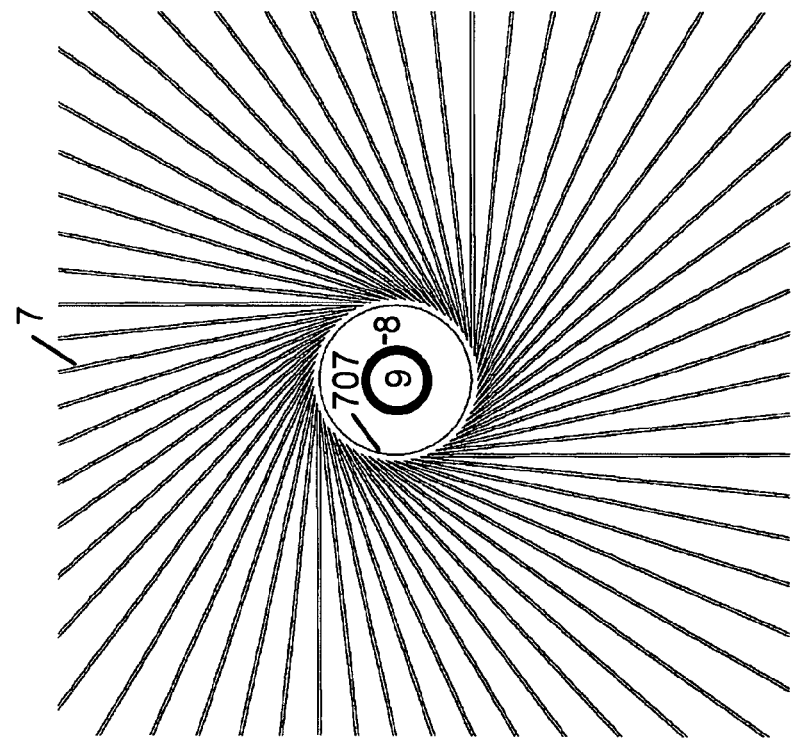
FIG. 1(a) storage mode (absorbing gain media)

CIRCULAR OPTICAL CAVITY ELECTRONICALLY SWITCHED BETWEEN AT LEAST TWO DISTINCT CAVITY MODES

This application is a continuation-in-part of U.S. application Ser. No. 12/082,887, filed Apr. 14, 2008, now issued, which is a divisional of U.S. application Ser. No. 10/968,280, filed Oct. 18, 2004, now issued, which is a continuation-in-part of U.S. application Ser. No. 09/839,254, filed Apr. 20, 2001, now issued, which claims benefit of U.S. Prov. Appl. No. 60/236,446, filed Sep. 29, 2000; all aforementioned applications are included herein by reference, in their entirety.

BACKGROUND OF THE INVENTION

1. Field of the Invention

The present invention relates generally to the field of mode discrimination means in laser cavities, and in particular, mode discrimination in macroscopic cavities wherein a vast number of modes may otherwise be sustained.

2. Description of the Related Art

The present invention relates generally to the field of lasers and optical resonator design, and in particular, to the fields of disk and spherical lasers. Also, the invention relates to cavity structure designs that utilize multi-layer dielectric (MLD) thin film reflectors that provide a high degree of mode selection. Inventive matter disclosed herein is related to co-pending U.S. patent application Ser. No. 09/839,254, filed Apr. 20, 2001.

Laser cavities of the disk and spherical geometries have become an increasingly intensive field of research; in particular, for such lasers that are fabricated on a miniature or microscopic scale. In the latter case, the predominant means of cavity reflection is through total internal reflection (TIR), which provides an extremely high cavity Q. Such reflective means normally manifest in "whispering modes," which propagate at angles below the critical angle for TIR. These microdisk and microsphere lasers are very effective in cases involving evanescent coupling to an adjacent dielectric structure; however, they are known to contain a very large number of competing high-order modes.

In addition, the coupling of these whispering modes for useful work is difficult for applications not utilizing evanescent coupling.

In recent years, theoretical studies have been performed on the development of derivation methods for cylindrical and spherical multilayer structures, which are aimed at providing an accurate description of the reflection coefficients and modal characteristics of these cavities. These studies address circular confinement structures with cavity dimensions on the order of the wavelengths studied. However, none of these studies are found to address the issues of applying similar circular Bragg reflectors for larger cavities of the scale used for gas and larger solid state cavities. Furthermore, these previous studies also entertain only the use of conventional MLD filters, with a large real refractive index difference, $n_H - n_L = \Delta n > 1$, for the layer pairs, and with an accordingly small number of layers required for high reflection.

The use of interference structures to enable high spectral resolving power in reflecting coatings has been described by Emmett (U.S. Pat. No. 4,925,259), wherein a very large number of alternating dielectric layers possessing a very small difference in refractive indices is used for application in high power flashlamps. The described coatings are utilized primarily for providing a high damage threshold to the high irradiance experienced in the flashlamp enclosure, as well as for obtaining a well-resolved pump wavelength for use in the described flashlamp.

The control of transverse modes in semiconductor lasers, primarily VCSEL's, has been reported by several research groups in the last decade. These latter reports utilize a circular Bragg grating structure as a complement to the planar Bragg mirrors of a conventional, high Q semiconductor cavity. Such circular Bragg gratings do not form the initial resonant cavity, but rather, aid in controlling relatively low Q, transverse modes of an existing Fabry-Perot structure. In such cases, the resultant control of transverse propagation may allow lowered thresholds, or enhanced stability.

Earlier, large-scale, laser designs of a circular geometry operated on very different principles than the microlasers, utilizing primarily gas laser mediums and metallic reflectors. In these earlier designs, optical power could be coupled for useful work at the center of the cavity, such as for isotope separation, or by using a conical reflector. Since, in these latter cases, laser modes that concentrated energy at the cavity's center were needed, some means for blocking the whispering-type modes was generally required. Such mode suppression was usually accomplished through radial stops; however, these stops only provided the most rudimentary mode control, in addition to hampering the efficient operation of the laser. Because of such issues, disk and spherical lasers have not supplanted standard linear lasers for any applications requiring substantial optical power or a high degree of mode selection.

SUMMARY OF THE INVENTION p number of high-index and low-index layer pairs in VHF-BR
$n_g$ refractive index of gain volume
$n_h$ refractive index of high-index layer in VHF-BR
$n_l$ refractive index of low-index layer in VHF-BR
$\Delta n$ difference in refractive index between $n_h$ and $n_l$
$n_l/n_h$ ratio in refractive index of $n_l$ to $n_h$
r radius of optical cavity (outside edge of the VHF-BR)
d thickness of gain volume
K average optical extinction of the VHF-BR
$\Delta\theta_r$ degrees of solid cone of reflection in optical cavity
$\theta_o$ central angle of highest reflectance in optical cavity
$\theta_n$ angle-of-incidence of a non-preferred mode in optical cavity
$\lambda_c$ wavelength of mode in optical cavity
$\lambda_p$ wavelength of pumping source
$\omega_p$ frequency of pumping oscillations
$\omega_c$ frequency of cavity oscillations
N number of pump sources
$\theta_s$ radial angle between pump sources as referenced from cavity axis (9)
$\theta_p$ phase angle between peak emissions from separate pump sources.

Definitions:

The term "surface-of-revolution", in the present disclosure will have the same meaning it does in mathematics, as a the three dimensional surface created by rotating a given profile around an axis, such as represented by cones, spheres, cylinders, etc. A "surface of revolution", in the present disclosure, will accordingly refer to surfaces of physical structures that form a surface of revolution.

In the detailed descriptions of the present disclosure, it shall be understood that the terms "VHF-based cavity" and "optical cavity" are used to indicate structures specifically pointed out to form such cavities.

The term "finesse" shall be understood to refer to its usage as a measure of an angular sensitivity obtained through a very large number of interfering waves, whether such waves are made collinear by diffraction or reflection.

Angle-of-incidence shall refer to the angle at which a paraxial ray of light is incident upon a surface, with orthogonal incidence being 0°.

A laser cavity is disclosed for use in such applications as lasers and light amplifiers in general. In its first preferred embodiment, the disclosed cavity comprises a cavity mirror structure that provides a single surface of revolution. The cavity volume is defined by this surface of revolution, and contains the gain medium. Unlike prior art disk and/or spherical lasers possessing circular cavities, the present invention does not rely on total internal reflection (TIR) or metallic reflectors to provide a high cavity Q-factor (and a broad range of high-order modes). The laser cavity design of the present invention avoids use of these cavity confinement methods. In the optical resonator of the present invention, interference-based multilayer dielectric (MLD) reflectors are constructed that can possess unusually narrow reflection peaks, corresponding to a degree of finesse (finesse designating interference-based resolving power) usually associated with MLD transmission filters of the Fabry-Perot type. The high-finesse MLD reflectors of the present invention conform to the surface of revolution of the cavity mirror structure, allowing a high degree of angle-dependence for selective containment of cavity modes. These filters are disposed in such a way as to allow preferred low order modes (lower order modes being represented in the present disclosure as those corresponding to near normal incidence radiation) and suppression of parasitic modes while allowing a high cavity Q factor for the modes selected.

For a multi-layer dielectric (MLD) coating consisting of alternating layers, where all layers have an optical thickness equal to a quarter-wave of light at the wavelength of interest, the reflectance may be described according to:

$$R = \left( \frac{1 - (n_H/n_L)^{2p}(n_H^2/n_s)}{1 + (n_H/n_L)^{2p}(n_H^2/n_s)} \right)^2 \quad (1.1)$$

wherein the index of refraction for the substrate is $n_s$, the two layer indices are $n_H$ (high index) and $n_L$ (low index), and the number of pairs of alternating layers is p. As is evidenced by equation (1), a higher reflectance may be achieved through the implementation of a greater difference in refractive index $\Delta n = |n_2 - n_1|$. Properties of quarter-wave MLD's, such as represented by eqn (1.1), are well-explored in the prior art of thin film filters. More exhaustive explanations may be found in Angus MacLeod's book, *Thin Film Optical Filters*, 2$^{nd}$ Ed., McGraw-Hill, 1989, pgs. 158-187, which is included herein by reference. High reflectance is thus normally achieved by maintaining $\Delta n$ at a relatively high value. However, as equation (1) suggests, high reflectance may also be achieved by depositing many layer pairs possessing a relatively low difference in their refractive indices. As the index difference decreases, many more pairs of alternating layers must be deposited to maintain reasonable reflectance. At the same time, this latter approach will result in a decrease in the bandwidth of light reflected by the resultant coating. The present invention utilizes MLD coatings which obtain high reflectance from an unusually low $\Delta n$; this is accomplished by maintaining a high degree of control over the properties of each layer through an unusually high number of iterations, p, of the layer pair. With well-controlled film characteristics, the reflectance of the resulting MLD coating may be fabricated to have a quite narrow bandwidth, typically in the order of nanometers.

Unlike the typically high $\Delta n$ of MLD-based Bragg reflectors used in semiconductor laser cavities of the prior art, the very high number p of low $\Delta n$ layer pairs provides for unique means of obtaining mode selection in cavities of the present invention, due to the high sensitivity of reflectivity to angle-of-incidence. Accordingly, the MLD-based Bragg reflectors of the present invention will be herein termed Very-High Finesse (VHF) Bragg reflectors, henceforth referred to as VHF-BR's, for purposes of teaching the embodiments disclosed herein. The multi-layer dielectric VHF-BRs described herein are, of course, physically and operationally distinct from grating structures that have also been called "Bragg reflectors" and provide an associated high finesse, but operate by diffraction. The disclosed VHF-BR is also dictinct from multilayer Bragg reflectors incorporating much larger $\Delta n$ and smaller p, so that sensitivity to angle-of-incidence is not adequate for providing useful mode-selection properties in the optical cavities contemplated herein. The disclosed VHF-BR-based cavities disclosed will also be found distinct from the multilayer Bragg reflectors and cavities utilized in "Bragg fiber gratings" that utilize high-index cavities for wave-guiding and in which divergence of a propagating beam is determined by the fiber structure.

A characteristic of the VHF-BR utilized in the present invention is the angle-dependence of the reflection peak. As the VHF-BR is irradiated at increasingly oblique angles of incidence, the spectrally narrow reflection peak will be shifted toward increasingly shorter wavelengths. While the degree of this latter peak shift will depend on such issues as phase dispersion and the change in optical admittance with increasingly oblique incidence, the fractional shift in the peak transmittance will change generally with the phase thickness shift. As such, the fractional shift in peak transmittance will be slightly less than cos θ, where θ is the angle from normal incidence. As the angle of incidence, θ, increases, the magnitude of the reflectance peak will generally decrease, as well. This decrease in magnitude will be made greater by the formation of the VHF-BR as a circular reflector, so that non-normal incident propagation suffers from a lack of coherence in its reflection from the curving layers of the reflector.

The aforementioned characteristics of these VHF-BR's are utilized in the preferred embodiments of the present invention. In accordance with the illustrated preferred embodiments, a laser cavity structure is disclosed herein that effectively utilizes the sensitivity of the aforementioned coatings to angle-of-incidence when these same coatings are irradiated with quasi-monochromatic light. This is normally accomplished through the use of a cavity mirror that conforms to a single surface of revolution. High confinement is achieved through use of the highly angle-dependent VHF-BR's. Thus, instead of utilizing TIR or metal films, which both provide wide acceptance angles to high order cavity modes, the present invention utilizes external reflection and narrow acceptance angles to increase the stability of selected, lower order, cavity modes.

Because the present invention does not rely on TIR or metallic films to provide high confinement for various laser modes, it is designed with a fundamentally different set of requirements for the refractive indices of its individual components. In contrast to the disk and spherical lasers of the prior art, the gain medium—or, equivalently, the volume in which it resides—in lasers of the present invention should preferably possess an effective refractive index, $n_g$, lower than that of the immediately surrounding medium. As such, the high index layers of the VHF-BR of the present invention must have a refractive index, $n_H$, greater than that of the gain volume.

In one preferred embodiment, the present invention is particularly suited to operation with excimer gases as the gain medium, due to the mode-selection means providing substantially improved cavity quality for the preferred modes, while allowing very little cavity confinement for unwanted cavity modes, so that conventional unstable resonators common to excimer laser design are no longer required to provide useful mode discrimination.

In another embodiment, the invention provides a unique configuration for coupling laser radiation from the center of a solid state laser cavity. The latter embodiment includes a solid state gain medium that is formed into an annular disk geometry having diameter larger than its thickness, so that efficient cooling of the medium may be performed through cooling of first and second opposing faces of the medium. The disclosed solid state gain medium further includes a first surface-of-revolution comprising its outer edge, whereon a VHF-BR is formed for cavity confinement of optical energy. The disclosed solid state gain medium also has a second surface-of-revolution comprising the inner edge of the annular disk, which provides a means for out coupling optical energy from the annular disk. Specific means for outcoupling optical energy from the annular solid state gain medium include a disclosed combination of a concentric conical reflector and beam condensation means.

In yet another embodiment, the invention provides mode selection means in solid state gain media that are polygonal in shape; for example, rectangular, pentagonal, trapezoidal, etc. Improved amplification and lasing characteristics are provided in such polygonal gain media through implementation of a VHF-BR reflector on one or more planar facets of the gain medium. This embodiment particularly includes a rectangular "slab" geometry that provides for an improved spatial uniformity in absorption and gain, thereby decreasing mechanical stress and thermal lensing effects. The disclosed slab geometry is incorporated in both amplification modules and in a slab laser design. The embodiment provides improved thermal characteristics over previous slab laser designs, and uniform pumping and absorption within the gain material may be achieved without use of "zig-zag" or other folded-cavity beam paths.

In yet another embodiment of the present invention, low loss and very high finesse are achieved in the VHF-BR through use of interleaved layers of polymer thin films as the low-index layer, the high-index layer, or both. This disclosed polymer-based VHF-BR I preferably composed of polymer high-index layers and inorganic (such as silica) low-index layers. In the polymer-based VHF-BR, a very large number of layers (>1,000) may be deposited without the surface roughening, loss of specularity, and optical absorption that is a common problem when depositing thick all-inorganic VHF-BR's.

In an alternative embodiment, a deformable cavity material is disclosed providing mode-selection properties, the material providing a flexibility allowing it to conform to a variety of cavity shapes. Also, it is seen as particularly advantageous that the flexible cavity material can be fabricated with a tailorable elasticity that allows the reflective properties to be tuned via an applied tensile strain.

In another embodiment, the invention provides a means for incorporating the VHF-BR and associated optical cavities into a dielectric layer that is formed on a planar substrate. In this embodiment, a VHF-BR is formed through modification of the dielectric layer to form therein a concentric pattern of many ring-shaped regions possessing an index-of-refraction that is slightly higher than that of the original dielectric layer, thereby forming a VHF-BR structure enclosing an unmodified central region of the dielectric layer, so that an optical cavity is formed by the VHF-BR and the central region. In yet another embodiment, the planar substrate is preferably a polished wafer, preferably made of single-crystalline silicon (e.g., Czochralski or Bridgeman grown), and the dielectic layer is capped with a silicon layer, resulting in a silicon-on-insulator (SOI) substrate that incorporates an optical cavity within an insulator layer of the SOI substrate. In these embodiments that incorporate a modified dielectric layer, a gain volume is alternatively formed within the central region of the disclosed optical cavity by such methods as diffusing a dopant ion into the central region of the dielectric layer.

In another embodiment, a multitude of pump sources are positioned over the gain volume of the optical cavity, in a preferably symmetric pattern, so that the multitude of pumps may be powered with a cyclical power signal. The frequency of the cyclical power, as well as the shape of the pattern, result in a method and structure for preferentially producing gain in a desired mode of oscillation in the optical cavity.

Other objects of the present invention follow.

One objective of the present invention is to provide a laser cavity structure that allows high thermal stability.

Another objective of the present invention is to provide a disk or spherical laser cavity structure that provides synchronous pumping by a patterned micro-source array.

Another object of the present invention is to provide a laser cavity structure which allows mode selection through the use of concentric pumping rings.

Yet another object of the present invention is to provide a cost-competitive approach to very large lasers useful for fusion research.

Another object of the present invention is to provide a laser cavity structure that allows a low threshold to lasing.

Another object of the present invention is to provide a means for irradiating a photo-absorbing medium from a continuous 360-degree periphery.

Another object of the present invention is to provide a laser cavity structure that allows efficient and stable mechanical design.

Another object of the invention is to provide a laser cavity structure that may be readily implemented for large-scale cavities.

Another object of the invention is to provide a means of manufacturing large laser facilities that are capable of relatively high-finesse irradiation of a circular target.

Another object of the invention is to provide a laser cavity structure with an unusually high effective numerical aperture.

Another object of the invention is to provide an excimer-based laser cavity that provides inherently better cavity confinement of preferred modes relative to unstable resonators of previous excimer lasers.

Another object of the invention is to provide an excimer laser that utilizes a circular electrode configuration for high operational stability.

Another object of the invention is to provide an gas laser that enables the use of cone elements for extracting energy.

Another object of the invention is to provide an gas laser cavity wherein an absorption edge of an incorporated material limits unwanted lasing.

Another object of the invention is to provide an gas laser that enables irradiation of circularly symmetric articles.

Another object of the invention is to provide an gas laser that enables irradiation of dispersed media.

Allows for an gas laser to be operated with excellent mode selection, without the use of the unstable resonators used in the prior art.

Allows for electron discharge pumping to be implemented in a more stable, higher symmetry configuration.

Another object of the invention is to provide an gas laser that utilizes a circular electrode configuration for high operational stability.

Another object of the invention is to provide an gas laser that enables the use of cone elements for extracting energy.

Another object of the invention is to provide an gas laser cavity wherein an absorption edge of an incorporated material limits unwanted lasing.

Another object of the invention is to provide an gas laser that enables irradiation of circularly symmetric articles.

Another object of the invention is to provide an gas laser that enables irradiation of dispersed media.

Another object of the invention is to provide a solid state laser device that allows efficient pumping of a very thin gain volume.

Another object of the invention is to provide a solid state laser cavity that is self-aligning.

Another object of the invention is to provide a solid state laser device that is monolithic.

Another object of the invention is to provide a thin-disk laser cavity that may be uniformly cooled on both faces.

Another object of the invention is to provide a thin-disk laser cavity that may be uniformly pumped on both faces.

Another object of the invention is to provide an edge-emitting solid state slab cavity that may be face-pumped.

Another object of the invention is to provide a solid state slab cavity that may be edge-pumped.

Another object of the invention is to provide a laser cavity mirror with a high laser damage threshold.

Another object of the invention is to provide a laser cavity mirror that incorporates advantages of both organic and inorganic materials.

Another object of the present invention is to provide a laser cavity mirror with low optical absorption.

Another object of the invention is to provide a laser cavity structure that is inexpensive to fabricate.

Another object of the invention is to provide a laser device that provides a substantially spherical wavefront for irradiation of spherical workpieces.

Another object of the invention is to provide a laser device that provides

Another object of the invention is to provide a solid state laser device that allows efficient pumping of a very thin gain volume.

Another object of the invention is to provide a solid state laser device that is self-aligning.

Another object of the invention is to provide a solid state laser device that is monolithic.

Another object of the invention is to provide a laser cavity that is contained within a silicon-on-insulator (SOI) substrate.

Another object of the invention is to provide an optically pumped laser cavity that can be fabricated with integral electronic devices.

Another object of the invention is to provide a wafer-based circular laser that sustains more than one mode close to the cavity's central axis.

Another object of the invention is to provide a means for mode selection in a laser cavity that utilizes synchronously addressed excitation sources.

Another object of the invention is to provide an all-optical switching means that utilizes walking cavity modes.

Other objects, advantages and novel features of the invention will become apparent from the following description thereof.

BRIEF DESCRIPTION OF DRAWINGS

FIG. 1(a-b) is close-up schematic view of the central region of a synchronously pumped wagon wheel optical cavity of the preferred embodiments.

DESCRIPTION OF THE PREFERRED EMBODIMENTS

Figure 2A:
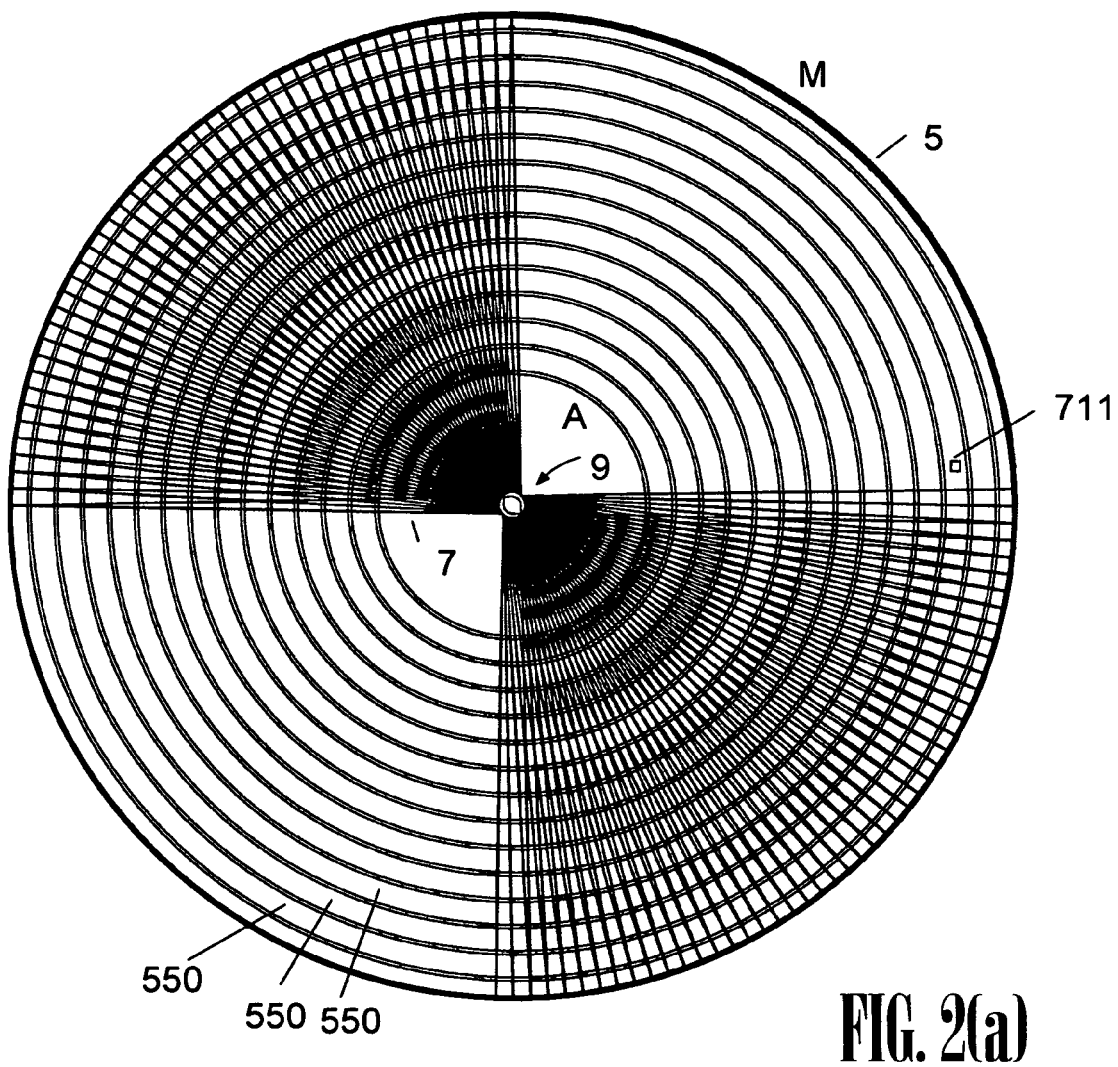
FIG. 2 is a top-view of a synchronous pumping arrangement of the preferred embodiments.
Figure 2B:
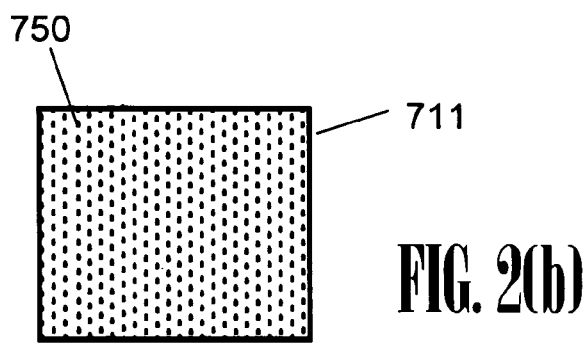

The following description and FIGS. 1-2 of the drawings depict various embodiments of the present invention. The embodiments set forth herein are provided to convey the scope of the invention to those skilled in the art. While the invention will be described in conjunction with the preferred embodiments, various alternative embodiments to the structures and methods illustrated herein may be employed without departing from the principles of the invention described herein. Like numerals are used for like and corresponding parts of the various drawings.

As disclosed in previous applications and included herein by reference, a wagon wheel optical cavity of the present invention is preferably formed as a thin-film Bragg reflector accordingly formed as a surface of revolution, wherein a preferred mode, which in one sense may be viewed as similar to a walk-off mode in a conventional confocal cavity, is, instead, a high-Q mode by virtue of rotating in (or walking around) the continuously circular Bragg cavity of the invention, wherein the Bragg reflector simultaneously frustrates whispering modes.

As is previously disclosed, one or more pump sources disposed to excite gain media in such wagon wheel optical cavities may be oscillated so as to preferentially and synchronously pump a preferred mode at a cycling frequency of the cavity, or with some harmonic relation to a cycling frequency of the cavity, for the preferred mode in question. Accordingly, such oscillation of one or more excitation means, or pumps, is preferably provided so as to preferentially pump a cavity mode, or to amplify an injected signal. The present invention is concerns primarily the case that low-order modes of the cavity, identified herein as those modes having propagation that is most normal to the reflector surface (5), or alternatively, closest to the cavity's central axis (9). In the preferred embodiment, wherein a coupling means (8) is provided at the central axis of the wagon wheel cavity, in FIG. 1(a-b), such synchronous pumping is preferably employed so as to switch the cavity between at least two separate modes, or alternatively, two different cycling frequencies, so that propagation adjacent the cavity's central axis is accordingly switched between two separate proximities to the central axis. Accordingly, electromagnetic propagation (7) within the cavity will be switched to uniformly provide two separate distances at closest point of approach, so that propagation of a higher mode of the cavity, propagating with a larger distance at closest point of approach (DCPA) to the central axis (9), will accordingly result in electromagnetic energy being concentrated in a circular volume centered about this resulting locus of points (707), in FIG. 1(a).

Preferably a coupling means (8) is located at the central axis (9) in the preferred embodiment, wherein a first mode comprising lower order mode with a relatively small DCPA is provided so as to interact with the coupling means, and a second mode comprising higher mode with relatively large DCPA is provided so as to propagate externally or outside the centrally positioned coupling means, wherein the second mode is, preferably, sufficiently high so that evanescent coupling to the coupling means is also avoided. In FIG. 1(a), the second mode propagates with DCPA having an effective radius larger than the coupling means (8). The first mode, which interacts with the coupling means, in FIG. 1(b), is accordingly such that the DCPA comprises a circle with radius equal to or smaller than the coupling means (8), so that the electromagnetic energy of the first mode accordingly irradiates the coupling means. Alternatively, the first mode may possess a locus of DCPA comprising a circle of slightly larger radius than the coupling means, wherein the first mode interacts with the coupling means evanescently.

It is preferred that the gain media of the inventive optical cavity be a gaseous gain media, though its applicability to solid-state, dye, metal vapor, and semiconductor gain mediums may be readily understood by those skilled in the art. In addition, it is preferred that the second, non-coupling mode comprise a storage mode, wherein the gaseous gain media is preferably capable of self-absorption or otherwise absorbing optical radiation, so that there is effective dumping of the cavity on switching to the first, coupling mode.

The coupling means of the preferred embodiment may be any means effective for usefully coupling electromagnetic energy out of the inventive cavity, whether this coupling means comprises an absorbing article or media, or else comprises a reflective, refractive, or diffractive element for directing the electromagnetic energy out of the cavity. More preferably the coupling means is an absorbing medium that absorbs electromagnetic energy of the cavity, and preferably a vapor; and even more preferably the vapor is that of a deposition source for depositing material on a substrate.

In an alternative preferred embodiment, the coupling means is an absorbing body comprising a fusion-related target such as micro-sphere or micro-cylinder. In the case that the coupling means is a fusion target, the inventive cavity means is preferably utilized to provide a heating pulse in a fast ignition configuration, wherein the ignition pulse, provided by other lasers, would preferably be directed along the central axis (9) and provided by linear resonators/amplifiers typical of existing inertial confinement fusion ICF facilities. More preferably, the target is ignited by two oppositely approaching ignition pulses that interact with opposing integral x-ray producing elements of the prior art, which are disposed on either end of an effectively cylindrical target, so that the inventive wagon wheel cavity may be utilized to irradiate the resulting cylindrical aspect of this target for its heating stage. It may also be readily contemplated that more than one such cavity of the invention be coupled together by annular refractive or reflective elements (large enough in diameter to avoid damage), and that spatial filters be utilized between such cavities as well. In this way, travel time of a pulse through consecutive wagon wheel cavities might allow a ballistic target to be irradiated without switching and use of KrF.

In addition to the preferred embodiment comprising synchronous pumping schemes incorporating a circular array of excitation sources that are powered in a sequential manner, so that a predetermined phase-angle exists between individual excitation sources of the array, it is also an alternative preferred embodiment that synchronous pumping of the wagon wheel optical cavity be realized by a concentric array of pump sources (550), A-M in FIG. 2, wherein concentric rings preferably comprise individually addressable discharge means for pumping a gas laser, preferably a Helium based gain media that can simultaneously provide ultraviolet radiation and an absorbing gain media that accordingly allows a storage mode. In this embodiment, phase-angle difference between adjacent excitation sources is preferably provided between adjacent rings, which, similar to previous disclosures by same author, are pumped with a harmonic relationship to the cavity cycling frequency of a preferred mode. Alternatively the gaseous gain media is an gas gain medium such as KrF.

In another alternative embodiment, each concentric region of the circular cavity may comprise an array of individually addressable micro-sources (750) that are preferably corona discharges, or alternatively micro hollow cathode discharge devices. In the case that the microsources (750) are incorporated in a large cavity, it is preferred that such microsources be formed by thin and thick film processes, and that the microsources be formed as an array based upon a large annular optic, preferably made by same methods as incorporated for manufacture of hexagonally reinforced telescope mirrors, wherein a substrate for a wagon wheel cavity with patterned microsources of the present invention would be essentially a very large telescope mirror with close to infinite radius as its surface figure. Such mirrors are made at the University of Arizona Mirror Lab.

It is not intended that the invention be limited to its preferred embodiments, since preferred operational characteristics of the present invention may be advantageously applied to devices similarly utilizing the preferred wagon wheel optical cavities. For example, smaller, Si wafer-based cavities, disclosed in prior co-pending applications, may benefit by incorporation of a central coupling means that is addressed by mode switching of the present invention, wherein the cavity cycling frequency would typically be a higher harmonic of a pumping frequency. Furthermore, it is not required that a mode be completely on or off, so that first and second mode may alternatively be in a low-power state (identified herein as "idling mode") or a high-power state (identified herein as "power mode"). In this way, such Si wafer-based cavities can have varying degrees of sensitivity to mode-hopping, depending on relative pumping powers, parasitic pumping effect, harmonic effects, gain media, and so on. In some cases, such switching between modes may possess hysteresis, and thereby effectively be switched as an effective bistable or multi-stable device that is switched by external events such as an evanescently coupled pulse from an optical fiber in a communications network, thereby providing a switchable cavity environment for processing subsequent pulses of a pulse train.

The preceding description provides an laser cavity structure that may be operated as a laser, optical amplifier, or other, optically resonating, device. Although the present invention has been described in detail with reference to the embodiments shown in the drawings, it is not intended that the invention be restricted to such embodiments. It will be apparent to one practiced in the art that various departures from the foregoing description and drawings may be made without departure from the scope or spirit of the invention.

What is claimed is:

1. A light amplification structure providing a preferred optical mode, comprising:
   a.) an optical cavity structure for providing preferred optical modes, the optical cavity structure comprising an annular reflector;
   b.) a gain region positioned within the cavity structure, the gain region positioned to provide optical energy to the optical mode; and,
   c.) pump sources positioned to pump the gain region, the pump sources positioned in a pattern selected for providing energy to the preferred optical modes, the preferred optical mode provided in accordance with a cycled characteristic of power provided to the pump sources, such that a first preferred optical mode is provided by means of a first cycled characteristic of the power, such that a second preferred optical mode is provided by means of a second cycled characteristic of the power, the first mode and the second mode characterized by a direction of propagation in the first mode spatially displaced from a direction of propagation in the second mode, the direction of propagation spatially displaced by means of a frequency difference between the first cycled characteristic and the second cycled characteristic;

d.) out-coupling means disposed to couple radiation out of the gain region, wherein a level of out-coupled radiation is effectively switched by switching between the first mode and the second mode.

2. The light amplification structure of claim 1, wherein the frequency is between several hertz and several hundred gigahertz.

3. The light amplification structure of claim 1, wherein the gain medium is a gas.

4. The light amplification structure of claim 1, wherein the gain medium is a solid.

5. The light amplification structure of claim 1, wherein the mode is a cavity mode.

6. The light amplification structure of claim 1, wherein the mode is not a resonant mode of the cavity.

7. The light amplification structure of claim 1, wherein the apparatus is used to irradiate a photo-absorbing medium that is passed through the cavity.

8. The light amplification structure of claim 1, wherein the apparatus is used to irradiate a spherical target for energy production.

9. The light amplification structure of claim 1, wherein the gain region is discontinuous.

10. The light amplification structure of claim 1, wherein the apparatus is a multi-mode source.

11. The light amplification structure of claim 1, wherein the apparatus comprises a high-brightness source.

12. The light amplification structure of claim 1, wherein the modes are non-stationary.

13. The light amplification structure of claim 1, wherein the means for pumping comprises a discharge.

14. A method for selectively amplifying a preferred mode in an optical cavity; comprising:
   a.) providing a circular cavity structure means for sustaining cyclic propagation within the structure, such that the structure has a circular symmetry about an axis of circular symmetry, the propagation roughly parallel to a plane orthogonal to the axis;
   b.) providing a gain medium positioned within the cavity structure, the gain medium positioned to provide optical energy to the propagation;
   c.) providing at least two pump sources, the pump sources each positioned to excite the gain medium; and,
   d.) providing power means for powering the pump sources, the power means powering the pump sources so that a cyclic excitation of the gain medium is provided, the cyclic excitation having a frequency selected to amplify the propagation, wherein pumping is switched to provide more than one propagation state, the pumping switched by means of altering the frequency, a first propagation state produced by means of a first frequency, a second propagation state produced by means of a second frequency, such that a spatial distribution of energy in the first propagation state is spatially displaced from a spatial distribution of energy in the second propagation state;
   e.) providing a coupling means for coupling radiation from the optical cavity, the coupling means disposed so as to preferentially couple radiation from the spatial distribution of the second propagation state, so that the coupling means couples energy from the cavity at a greater rate in the second propagation state.

15. The method of claim 12, wherein the frequency is between several hertz and several gigahertz.

16. A laser pumping structure for providing laser emission, comprising:
   a.) pumping means positioned for pumping a gain medium, the pumping means comprising a substantially concentric array of excitation structures, the array of excitation structures for exciting the gain medium, the array of excitation structures powered in a cyclic manner, so that the gain medium emits optical energy into a preferred mode when excited by the excitation structures;
   b.) a cavity structure forming a cavity comprising a ring-shaped reflector, such that the mode comprises propagation reflectively rotated about the cavity with a rotation frequency, wherein a modification of a frequency of excitation results in a modification of the rotation frequency; and
   c.) out-coupling means disposed to couple radiation out of the cavity structure, wherein a level of out-coupled radiation is switched by the modification of the rotation frequency.

17. The light amplification structure of claim 1, wherein the reflector is formed by modulating a refractive index in a preformed material.

18. The light amplification structure of claim 1, wherein a region on the reflector corresponds to a region of lowered reflectivity for coupling energy out of the cavity through the surface of revolution.

19. The light amplification structure of claim 1, wherein the reflector is discontinuous.

20. The light amplification structure of claim 1, wherein the reflector is a substantially toroidal surface.

* * * * *